United States Patent [19]

Haase et al.

[11] 3,837,695

[45] Sept. 24, 1974

[54] BUMPER MEMBER FOR A VEHICLE

[75] Inventors: Ernst-Günter Haase, Egmating; Rudolf König, Ottobrunn, both of Germany

[73] Assignee: Messeschmitt-Bolkow-Blohm, Munich, Germany

[22] Filed: Feb. 15, 1973

[21] Appl. No.: 332,593

[30] Foreign Application Priority Data
Feb. 18, 1972  Germany.......................... 2207560

[52] U.S. Cl................. 293/71 P, 293/88, 267/140
[51] Int. Cl............................................. B60r 19/08
[58] Field of Search........ 293/1, 60, 70, 71 R, 71 P, 293/88, 98; 114/219; 267/116, 140, 141; 137/525

[56] References Cited
UNITED STATES PATENTS

| | | | |
|---|---|---|---|
| 1,709,494 | 4/1929 | Shoemaker........................ | 293/71 P |
| 2,731,290 | 1/1956 | Corydon........................... | 293/71 P |
| 3,043,404 | 7/1962 | Peras................................ | 137/525 |
| 3,610,609 | 10/1971 | Sobel............................... | 293/71 R |
| 3,674,115 | 7/1972 | Young et al. ...................... | 293/60 |
| 3,690,710 | 9/1972 | Curran............................. | 293/60 |
| 3,695,665 | 10/1972 | Matsuura......................... | 293/71 R |

FOREIGN PATENTS OR APPLICATIONS

| | | | |
|---|---|---|---|
| 1,305,853 | 8/1962 | France............................. | 137/525 |

Primary Examiner—M. Henson Wood, Jr.
Assistant Examiner—Robert Saifer
Attorney, Agent, or Firm—Toren, McGeady and Stanger

[57]  ABSTRACT

A bumper-like member for a vehicle is formed of a closed flexible hollow body containing a highly compressible fluid, such as air, and a bending support beam on which the hollow body is supported. Preferably, a flexible cover member is secured to the supporting beam and encloses the hollow body. The compressible fluid in the hollow body can be at ambient pressure or at a pressure above ambient. A pressure release valve is connected to the hollow body and is arranged to open when the compressible fluid reaches a predetermined level after the hollow body has contacted an obstacle in the path of the vehicle. An additional bending support beam can be positioned in bearing contact with the hollow body on the opposite side from the other supporting beam and further hollow bodies can be mounted on the additional supporting beam on the opposite side from the other hollow body. In addition to the pressure release valve, an opening is provided into the hollow body through which air can be reintroduced after it has been released through the release valve.

4 Claims, 6 Drawing Figures

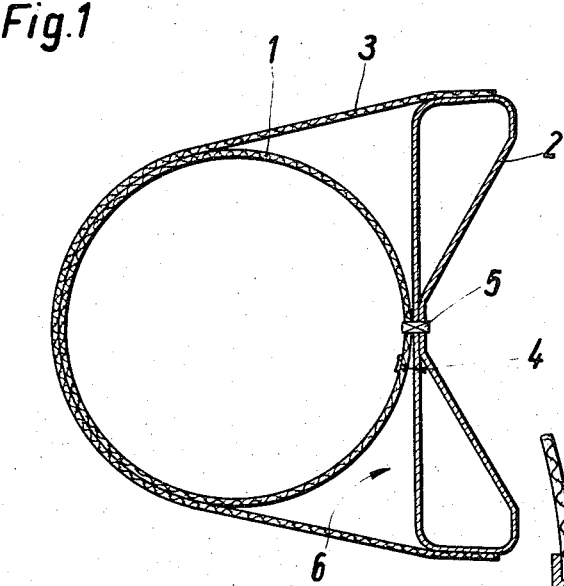
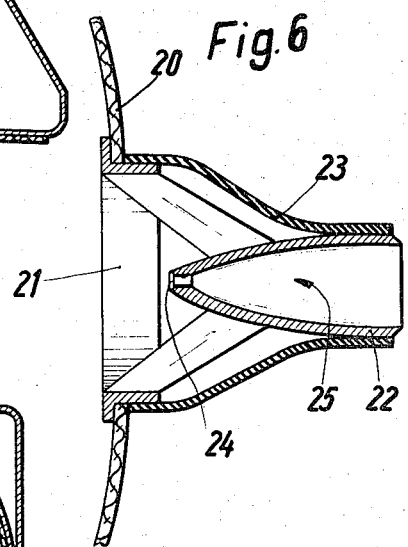
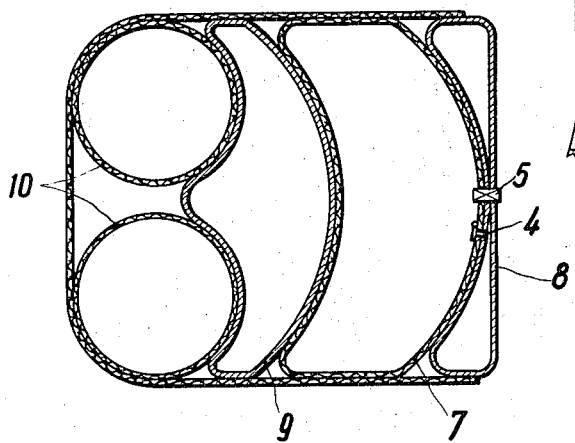

BUMPER MEMBER FOR A VEHICLE

BACKGROUND OF THE INVENTION

To protect the body of a vehicle when it collides with an obstacle in its path, bumpers extending transversely across the front and rear of the vehicle are mounted on its chassis to absorb, to some degree, the shock experienced in a collision. The problem generally faced with such bumpers is whether to design them or their supports for absorbing shock without exceeding a certain limiting load for which the chassis is designed. One solution to the problem is to support the bumpers from the chassis by means of shock absorbers, however, this results in a heavy shock absorber construction. Moreover, damage to the bumpers cannot be avoided, particularly where there is a limited area of contact between the bumper and the obstacle it strikes against, such as a pole, tree and the like.

In one known type of bumper, a water-filled member is used which bears against the chassis of the vehicle, however, such a bumper has not provided a satsifactory solution to the problem. Though the water-filled member is provided with valves which open under pressure so that shock can be absorbed without damage to the bumper, the use of water makes the bumper construction extremely heavy. Further, the member must be filled with water each time the bumper experiences a collision sufficient to discharge the water and the refilling operation involves considerable work and effort. Additionally, antifreeze must be used in the water-filled member to protect it from freezing.

SUMMARY OF THE INVENTION

The present invention is directed to a bumper construction for a vehicle and, more particularly, it is directed to the use of a flexible hollow body filled with a compressible fluid, such as air, for absorbing shock up to a certain limiting pressure for which it is designed. An important advantage of such a bumper is that it requires little or no maintenance. The basic arrangement of the present invention is the combination of at least one flexible hollow body containing a highly compressible fluid medium, such as air, with the hollow body bearing or mounted on a bending support beam.

In a bumper formed in accordance with the present invention, the supporting beam can be mounted on the chassis or form a part of the body of the vehicle and the flexible hollow body can adapt itself to any unevenness in the obstacle which it contacts so that local surface pressure is very low. As a result, the shock transferred to the vehicle can be limited to the required extent.

In operation, the internal pressure within the hollow body can be equal to the ambient pressure. By providing a shut-off element in the hollow body which opens automatically when a certain pressure level is reached, when in a collision the hollow body strikes an obstacle initially, a compression of the flexible hollow body takes place and there is a simultaneous rise in its internal pressure. When the limiting pressure determined by the shut-off element is reached, a further increase in pressure is prevented, since the shut-off element acts as a pressure release valve and permits the air to escape from the hollow body. As a result, the hollow body absorbs the shock of the collision and the clearance after the complete compression of the hollow body is kept small and there is practically no rebound. When the hollow body is no longer in contact with the obstacle which caused its compression, it regains its original shape. To be able to return to its original shape, it is only necessary for the body member to have an elastically deformable configuration so that once the cause of its deformation is removed it will return to its original shape and by providing a suction bore in contact with the interior of the hollow body any air discharged form it can be reintroduced into its interior.

To be able to use such a bumper where local loads of considerable extent are experienced, such as when the bumper strikes an uneven obstacle, it is necessary only to have one bending support beam bearing against and supporting the hollow body. The support beam will transmit the force which results when the bumper strikes against a tree trunk, a wall and the like and, instead of a point type transmission of the force, the support beam will transmit it as a line of force.

To protect the bending support beam against local overloads, at least one flexible hollow body with its interior pressurized above the ambient pressure can be used in front of the beam. The advantage of such an arrangement, compared to the use of a conventional elastic protective coat over the surface of the supporting beam, is that the hollow body converts locally applied shock transversely across the full extent of the support beam and, up to the limiting internal pressure within the hollow body, punctiform shocks can be transmitted across the full surface of the support beam rather than to a single point on its surface.

In place of a single hollow body, a plurality of hollow bodies can be arranged one backing the other with an additional supporting beam between them for absorbing the shock so that the interior hollow body provides both resilience and absorption. If the exterior body is provided with a shut-off element in the same manner as the interior hollow body then a double acting shock absorption can be provided through the double arrangement of the hollow bodies.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWING

In the drawing:

FIGS. 1, 2 and 4 are cross sectional views of a bumper member, in accordance with the present invention, which includes a single air-filled hollow body;

FIGS. 3 and 5 are cross sectional views of a bumper member similar to that shown in the above mentioned figures but containing three air-filled hollow bodies; and FIG. 6 is an enlarged detail view of a shut-off element.

DETAILED DESCRIPTION OF THE INVENTION

Figure 2:
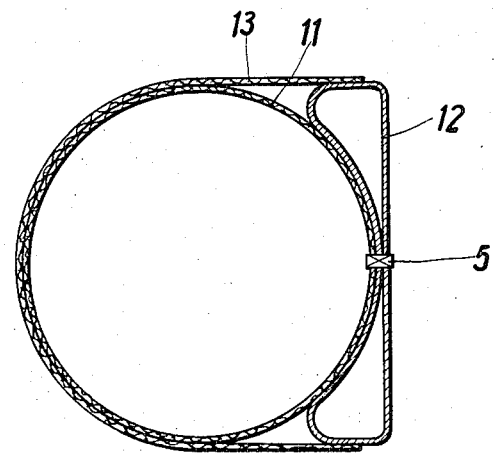

In FIG. 1 a bumper is shown for protecting a vehicle, not illustrated, against shock forces when the vehicle strikes an obstacle in its path of travel. The bumper consists of a completely closed hollow body 1 which bears against, on one side, a bending support beam 2 formed, for example, from an extruded hollow section. The wall of the hollow body 1 is formed of an elastic deformable material which, after the element causing it to deform is removed from contact with the surface of the hollow body, will return to its original shape. One construction which can be used for the wall of the hollow body is a hose fabric with a spring insert. Alternatively, in place of the spring insert in the wall of the hollow body, spring elements can be provided within its interior and afford the same function. Secured to the opposite ends of the support beam 2 is a flexible cover 3 which laterally encloses the hollow body 1. The support beam can be mounted on the chassis in a known manner, for example, by means of a W-shaped support, or it can form a part of the body of the vehicle itself.

The interior of the hollow body 1 is filled with air to a pressure equal to the ambient pressure. Further, the hollow body 1 has a suction bore 4 and a pressure release valve 5 communicating with its interior. The valve 5 is of a known design, it is shown only schematically in FIG. 1, and opens automatically when a predetermined pressure level is reached within the hollow body and, as a result, the pressure within the hollow body cannot exceed the predetermined pressure. When the pressure within the hollow body drops below the predetermined pressure, the valve closes, preferably automatically. The flow cross section of the suction valve, is much smaller than that of the pressure release valve 5 and the bore has a swivel flap located in the interior of the hollow body.

If the bumper contacts an obstacle, for example a wall, the hollow body will absorb the shock of the colliding action and the pressure of the air within the hollow body will rise. When the predetermined or limiting pressure for the interior hollow body is reached, which pressure depends on the weight of the vehicle and on the dimensions of the bumper, the pressure release valve will open. As a result, as the hollow body 1 absorbs the shock resulting from the collision with the obstacle, it will contract completely for all practical purposes and will be disposed in contact with the planar supporting surface 6 of the support beam 2 and there will practically no rebound. In this way the volume of air enclosed by the hollow body before the impact is discharged almost completely. When the obstacle causing the bumper to deform is removed, the elastically deformable hollow body will automatically assume its original shape with the valve 5 being closed and the volume of air being introduced into the hollow body through the suction bore 4. In this arrangement, there is no maintenance required on the bumper to return it to its original configuration.

In place of the suction bore 4 and pressure release valve 5, the hollow body can be provided with an elastically constructed outlet opening which opens automatically when the pressure within the hollow body rises above a predetermined level. As shown in FIG. 6 the outlet opening is provided by a metal ring 21 fitted into the cover 20 of the hollow body with a replacement body 22 secured to and positioned outwardly from the opening into the hollow body. The metal ring 21 is fixed to the cover 20 by means of an adhesive or the like. As shown in FIG. 6, a hose-like member 23 formed of an elastic material extends from the ring 21 outwardly to the replacement body 22. In the closed position, the hose-like member is in contact with the outer surface of the replacement body and prevents the flow of air outwardly from the hollow body. However, the hose-like member is arranged to separate from the replacement body when the pressure within the hollow body reaches a certain level so that the air from within the hollow body can be discharged. After the hollow body has been compressed, the volume of air displaced from it can be reintroduced through a bore 25 formed in the replacement body. Under ordinary operating conditions, a flap 24 forms a closure for the bore 25.

In FIG. 3 another arrangement of the bumper is shown with the elastically deformable hollow body 7 positioned between a pair of bending support beams 8 and 9. Relative to the vehicle the hollow body 7 is positioned outwardly from the support beam 8 and the support beam 9 is positioned outwardly or in front of the hollow body 7. Further, two elastically deformable hollow bodies 10 are positioned in front of the support beam 9, that is on the opposite side thereof from the hollow body 7. The hollow bodies 10 are pressurized internally and provide the surface through which a shock force is introduced into the bumper. As with the arrangement in FIG. 1, a cover laterally encloses the hollow bodies 7, 10 and the support beam 9. In this arrangement the hollow body 7 operates in the same manner as described above and it has the function of resilience and absorption.

In the bumper arrangement shown in FIG. 3, any impact applied locally to the front hollow bodies 10 is transmitted through the support beam 9 as a line force to the inner hollow body 7. The outer hollow bodies 10 can absorb punctiform impact and transmit such impact over the entire support beam 9 thus protecting the support beam against local overloads. To protect the entire bumper arrangement against excessive forces, the outer hollow bodies 10 can be provided with pressure release valves of the type described above so that they also afford an absorption function. As with the bumper arrangement shown in FIG. 1, the arrangement in FIG. 3 has a small clearance to the rear of the hollow body 7 so that when the hollow body is completely compressed against the surface of the support beam 8 rebound is practically impossible.

In the bumper arrangement disclosed in FIG. 2, a closed elastically deformable hollow body 11, such as formed of a hose material, bears against the surface of a support beam 12. The hollow body is filled with air, however, in contrast to the arrangement shown in FIG. 1, it is pressurized internally as compared to the ambient pressure. A cover, if necessary formed of the same type of material as the hollow body, laterally encloses the ollow body. The pressure release valve 5 within the hollow body 11 automatically limits the pressure within the hollow body to a certain level, when that level is reached the valve opens automatically and when the pressure drops below the predetermined level the valve closes. If the bumper collides against an obstacle, it deforms and a rise in the internal pressure takes place until the predetermined pressure level is reached at which the valve 5 opens. Thus, the shock of the impact is absorbed. After the hollow body 11 has completely compressed, the residual air volume enclosed within the body expands to ambient pressure, and a slight rebound occurs. The rebounding action can be completely prevented if a valve is used which does not close automatically. The displaced volume of air can be reintroduced without any special effort, such as by the use of a hand pump or a gas station air pump.

It is not necessary to refill the hollow body with air if it is connected to an equalizing vessel hich is maintained under the same internal pressure conditions. By interposing a valve which opens automatically between the hollow body and the equalizing vessel and valve will have a throttling effect in the case of any backflow into the hollow body. When the bumper strikes an obstacle, the valve permits a rapid flow of air from the hollow body into the equalizing vessel, with the result that the pressure increase in the hollow body remains small until it is completely compressed. When the compressing action on the hollow body is released a throttled backflow takes place from the equalizing vessel into the hollow body until it is returned to its original condition. The equalizing vessel can be connected to the hollow body by a hose line, if necessary, and can be arranged, for example, under the fender of the vehicle.

Figure 4:
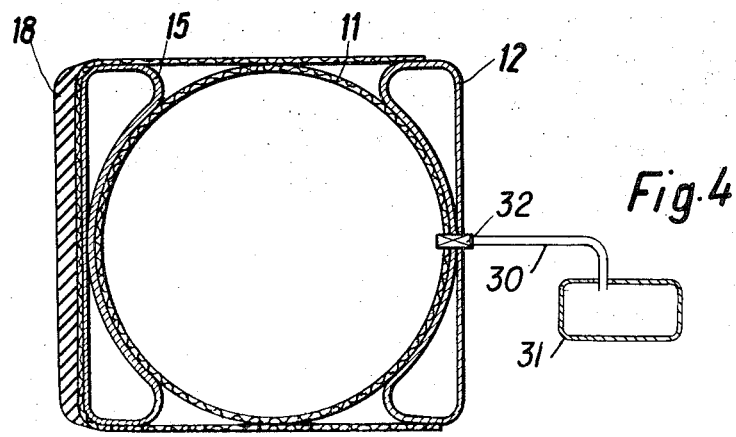
Figure 5:
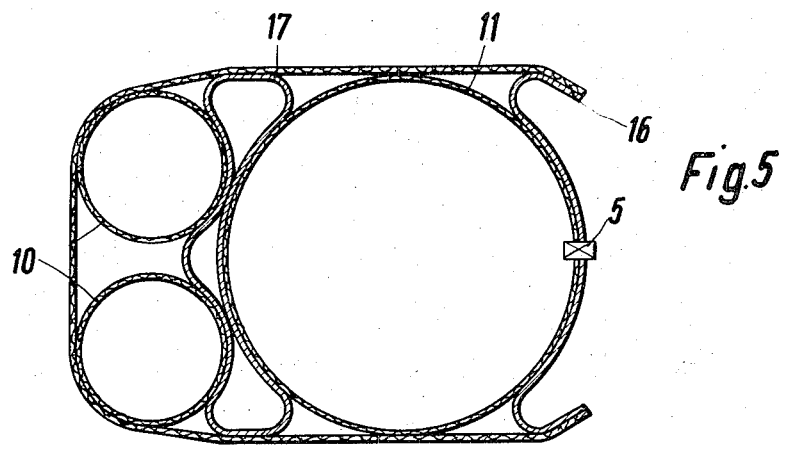

In FIGS. 4 and 5 other arrangements of the bumper member are shown in each of which a hollow body 11 is provided between a pair of substantially complementary shaped support beams 12–15, and 16–17, respectively, the hollow body having the same characteristics as that in FIG. 2 and having the same characteristics of resilience and absorption. The support beams are located on the opposite sides of the hollow body and the outer or front support beams 15 and 17, together with the elastic support 18 of FIG. 4 or the two flexible hollow bodies 10 of FIG. 5 transfer the impact to the hollow body 11. It will be noted that the support beams themselves are hollow structures, thereby being able to transmit and resist impact forces without permanent deformation. The hollow body 11 acts in the same manner as the hollow body 7 in FIG. 3. The inner support beam 16, shown in FIG. 5, is arranged to form a part of the body of the vehicle on which the bumper is mounted. FIG. 4 also illustrates the previously referred to equalizing vessel 31 which communicates with the interior of the hollow body 11 through hose conduit 30. A valve member 32 or the like means for establishing and controlling the communication between the hollow body 11 and the conduit 30, and thus the equalizing vessel 31 may be arranged between the conduit and the hollow member. In still another arrangement, the bumper can be formed by a hollow body consisting of an elastic hose bearing against a support beam so that the hollow body expands elastically in such a manner under the action of an impact that the given internal pressure within the hollow body varies only slightly when it is compressed.

It should be noted that the shock absorbers can be positioned along the longitudinally extending sides of the vehicle as well as across its front and rear ends.

While specific embodiments of the invention have been shown and described in detail to illustrate the application of the inventive principles, it will be understood that the invention may be embodied otherwise without departing from such principles.

What is claimed is:

1. A bumper member for a vehicle for absorbing shock when the bumper member contacts an obstacle, comprising a closed elastically deformable first hollow body arranged to contain a highly compressible fluid, such as air, and a first bending support beam forming a support for said first hollow body with said support beam located on the opposite side of said first hollow body from the side thereof facing outwardly from the vehicle, a pressure release member provided in said first hollow body for releasing the compressible fluid within said hollow body when it has reached a predetermined pressure level, said pressure release member including a support member mounted on said hollow body and an annular member formed of an elastic material mounted on said support member and having a normally closed condition for retaining the compressible fluid within said hollow body so that when a predetermined pressure level is reached said annular member deforms into an open position and releases the compressible fluid from said hollow body, said support body comprising a metal ring secured to said hollow body and defining an opening from said hollow body, a replacement body secured to said ring and positioned outwardly from said hollow body in alignment with the opening in said ring, and said annular member comprising a hose like section secured at one end to said ring and in its normally closed condition being in contacting relationship with said replacement body for preventing flow from said hollow body and deflecting outwardly from said replacement body for releasing the compressible fluid when the predetermined pressure level has been reached, said replacement body having a normally closed bore therethrough in communication with the interior of said hollow body for admitting the compressible fluid into said hollow body after it has been expelled through said annular member.

2. In a bumper member for a vehicle, wherein impact forces are absorbed by a flexible hollow body which is filled with a flowable, highly compressible fluid, such as air, and wherein said hollow body extends along and abuts against a support capable of transmitting impact forces, the improvement which comprises a front support member capable of transmitting impact forces and extending substantially complementarily to said support, said hollow body being interpositioned between said support and said front support member, an equalizing vessel and means for establishing communication between said hollow body and said equalizing vessel, said support and support member each having a hollow structure.

3. The improvement as claimed in claim 2, wherein at least one closed elastically deformable hollow member is positioned in bearing contact with said front support member and is located on the side of said front support member which faces away from said hollow body, the interior of said hollow member being pressurized above ambient pressure.

4. A bumper member, as set forth in claim 3, wherein a pressure release member is provided in said hollow member for releasing the compressible fluid within said hollow member when it has reached a predetermined pressure level.

* * * * *